United States Patent
Motomori et al.

(10) Patent No.: US 7,994,757 B2
(45) Date of Patent: Aug. 9, 2011

(54) DC-DC CONVERTER

(75) Inventors: Mikio Motomori, Osaka (JP); Takuya Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 423 days.

(21) Appl. No.: 11/902,829

(22) Filed: Sep. 26, 2007

(65) Prior Publication Data

US 2008/0079409 A1 Apr. 3, 2008

(30) Foreign Application Priority Data

Sep. 29, 2006 (JP) .................................. 2006-267187

(51) Int. Cl.
G05F 1/10 (2006.01)
(52) U.S. Cl. ........................... 323/222; 323/285; 361/18
(58) Field of Classification Search .................. 323/222, 323/282, 284, 285, 290, 351; 361/18, 93.1
See application file for complete search history.

(56) References Cited

U.S. PATENT DOCUMENTS

| | | | | |
|---|---|---|---|---|
| 5,229,707 A | * | 7/1993 | Szepesi et al. ................. | 323/222 |
| 5,892,353 A | * | 4/1999 | Yama ............................. | 323/282 |
| 6,166,528 A | | 12/2000 | Rossetti et al. | |
| 6,307,360 B1 | | 10/2001 | Kajiwara et al. | |
| 7,068,023 B2 | * | 6/2006 | Okada ........................... | 323/285 |
| 7,091,705 B2 | | 8/2006 | Hoshino et al. | |
| 2005/0127883 A1 | * | 6/2005 | Hoshino et al. ................ | 323/274 |

FOREIGN PATENT DOCUMENTS

| | | |
|---|---|---|
| JP | 61-92165 | 5/1986 |
| JP | 2000-245141 | 9/2000 |
| JP | 2001-136737 | 5/2001 |
| JP | 2003-189598 | 7/2003 |
| JP | 2004-312909 | 11/2004 |
| JP | 2005-117810 | 4/2005 |
| WO | WO 2005/091482 A1 | 9/2005 |

OTHER PUBLICATIONS

Japanese Office Action issued in Japanese Patent Application No. JP 2006-287167 dated Feb. 8, 2011.

* cited by examiner

*Primary Examiner* — Jessica Han
(74) *Attorney, Agent, or Firm* — McDermott Will & Emery LLP

(57) ABSTRACT

To securely detect the short-circuited state of a rectifier without detecting current and to protect a switching device in a DC-DC converter, in a state in which the potential at the connection point of the rectifier and the switching device is detected and a drive signal turns ON the switching device, the protection circuit of the DC-DC converter is configured to securely turn OFF the switching device when the potential at the connection point is a predetermined potential or more.

13 Claims, 5 Drawing Sheets

PRIOR ART

United States Patent US 7,994,757 B2

DC-DC CONVERTER

BACKGROUND OF THE INVENTION

The present invention relates to a DC-DC converter for supplying a DC voltage to various electronic apparatuses, and more particularly, to a DC-DC converter capable of raising a voltage using a switching system.

In recent years, step-up circuits in switching-type DC-DC converters are used as step-up circuits for numerous electronic apparatuses in which a battery is used as a DC power supply since the step-up circuits have high power conversion efficiency. FIG. 5 is a circuit diagram showing the configuration of a conventional step-up circuit disclosed in Japanese Patent Application Laid-open No. Sho 61-92165. Generally speaking, a step-up circuit is configured as shown in FIG. 5. That is to say, one terminal of an inductor 202 is connected to a DC power supply 201, one terminal of a main switch 203 is grounded, and the other terminal thereof and one terminal (anode) of a diode 204 are connected to the other terminal of the inductor 202. To the other terminal (cathode) of the diode 204, an output capacitor 205 is connected, and an output voltage Vo is supplied to a load 206.

The output voltage Vo is input to an error amplifier 207, compared with a reference voltage Vref and fed back to a control circuit 208. The control circuit 208 controls the ON/OFF operation of the main switch 203 so that the output voltage Vo is stabilized at a target value. By the ON/OFF operation of the main switch 203, energy storing and discharging in the inductor 202 are repeated, and the output voltage Vo higher than the input voltage Vi of the DC power supply 201 is generated. In the conventional step-up circuit configured as described above, when the diode 204 breaks down and short-circuited, the electric charge charged in the output capacitor 205 flows reversely to the main switch 203 via the short-circuited diode 204 and is discharged. At the time of the discharging, there is a danger that the main switch 203 may also be damaged.

To protect the main switch 203 at the time when the diode 204 is short-circuited as described above, a protection circuit is provided for the step-up circuit shown in FIG. 5. Referring to FIG. 5, numeral 230 designates a current detector for detecting the current flowing in the main switch 203, numeral 231 designates a comparator for judging whether the current flowing in the main switch 203 has reached a predetermined level or not, numeral 240 designates a current detector for detecting the current flowing in the diode 204, numeral 241 designates a comparator for judging whether the current flowing reversely to the diode 204 has reached a predetermined level or not, numeral 242 designates an OR circuit for outputting the logical OR of the outputs of the comparator 231 and the comparator 241 to the control circuit 208.

In the case that the diode 204 is short-circuited, when the main switch 203 turns ON, the current flowing reversely in the diode 204 increases abruptly, and the output of the comparator 241 becomes H level. Hence, the OR circuit 242 outputs an H-level signal to the control circuit 208. The control circuit 208, to which the H-level signal is input from the OR circuit 242, turns OFF the main switch 203 to protect the main switch 203 against overcurrent.

It is ideal that a diode is configured so that no current flows reversely during the ordinary operation. Hence, in the protection circuit 208 configured as described above, the reverse current detection level detected using the current detector 240 and the comparator 241 can be set so as to be lower than the maximum turn OFF current level of the main switch 203 detected using the current detector 230 and the comparator 231. For this reason, the reverse current can be detected accurately, and the main switch 203 can be protected securely.

However, in the step-up circuit in the conventional DC-DC converter configured as described above, the current flowing in the main switch 203 is detected, and the current flowing in the diode 204 is also detected. In addition, although it is preferable that a synchronous rectification circuit should be used instead of the diode 204 to raise response, the synchronous rectification circuit allows reverse current flow even during the ordinary operation in some cases, and in such a case, the reverse current detection level must be set high. It is thus difficult to apply the above-mentioned protection circuit.

Furthermore, as portable apparatuses are made compact in recent years, switching devices, such as a main switch, and rectifiers, such as a diode, being used for a step-up circuit in a DC-DC converter are frequently mounted in a one-chip semiconductor integrated circuit. In such a semiconductor integrated circuit, it is desirable that the components thereof are not broken down when a short-circuit test is carried out between adjacent terminals. In other words, during such a short-circuit test, the rectifier is short-circuited in some cases, and during the short-circuit test, the other components must be prevented from being broken down at any cost. Since the short-circuited state of the rectifier occurs not only owing to the breakdown of the rectifier itself but also owing to other causes, after such causes for the short-circuited state are eliminated, it is desired that the ordinary operation is restored automatically.

SUMMARY OF THE INVENTION

An object of the present invention is to provide a DC-DC converter capable of securely detecting the short-circuited state of a rectifier without detecting current and capable of protecting the components of the DC-DC converter.

To attain the above-mentioned object, a DC-DC converter according to a first aspect of the present invention comprises:
  a rectifier and a switching device connected in series,
  a storing device for storing energy during the ON period of the switching device and for discharging the energy via the rectifier during the OFF period of the switching device,
  a capacitive device for smoothing the output of the rectifier,
  a control circuit for generating a drive signal for ON/OFF controlling the switching device, and
  in a state in which the potential at the connection point of the rectifier and the switching device is detected and the drive signal turns ON the switching device, a protection circuit for turning OFF the switching device at the time when the potential at the connection point is a predetermined potential or more. The DC-DC converter according to the present invention configured as described above securely detects the short-circuited state of the rectifier without detecting current and can protect the switching device serving as a component of the DC-DC converter.

In a DC-DC converter according to a second aspect of the present invention, the protection circuit according to the first aspect comprises a voltage supply circuit for generating the predetermined potential, a comparator for comparing the potential at the connection point with the predetermined potential, and a logic circuit for outputting a predetermined signal to the control circuit when the drive signal turns ON the switching device and when the output of the comparator indicates that the potential at the connection point is the predetermined potential or more, wherein
  the control circuit is configured such that the drive signal turns OFF the switching device for a predetermined period when the predetermined signal is input from the logic circuit.

In a DC-DC converter according to a third aspect of the present invention, the protection circuit according to the second aspect comprises a delay circuit for delaying the drive signal input to the logic circuit by a predetermined delay time.

In a DC-DC converter according to a fourth aspect of the present invention, the protection circuit according to the second or third aspect is configured such that the switching device is fixed to the OFF state using the drive signal when the period during which the logic circuit outputs the predetermined signal at each switching operation of the switching device continues.

In a DC-DC converter according to a fifth aspect of the present invention, the step-up circuit thereof comprises the rectifier, the switching device, the storing device, the capacitive device, the control circuit, and the protection circuit according to any one of the first to fourth aspects.

In a DC-DC converter according to a sixth aspect of the present invention, the step-up/down circuit thereof comprises the rectifier, the switching device, the storing device, the capacitive device, the control circuit, and the protection circuit according to any one of the first to fourth aspects.

The DC-DC converter according to the present invention securely detects the short-circuited state of the rectifier without detecting current and can securely protect the switching device serving as a component against overcurrent.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

A step-up circuit serving as a preferred embodiment of a DC-DC converter according to the present invention will be described below referring to the accompanying drawings.

First Embodiment

Figure 1:
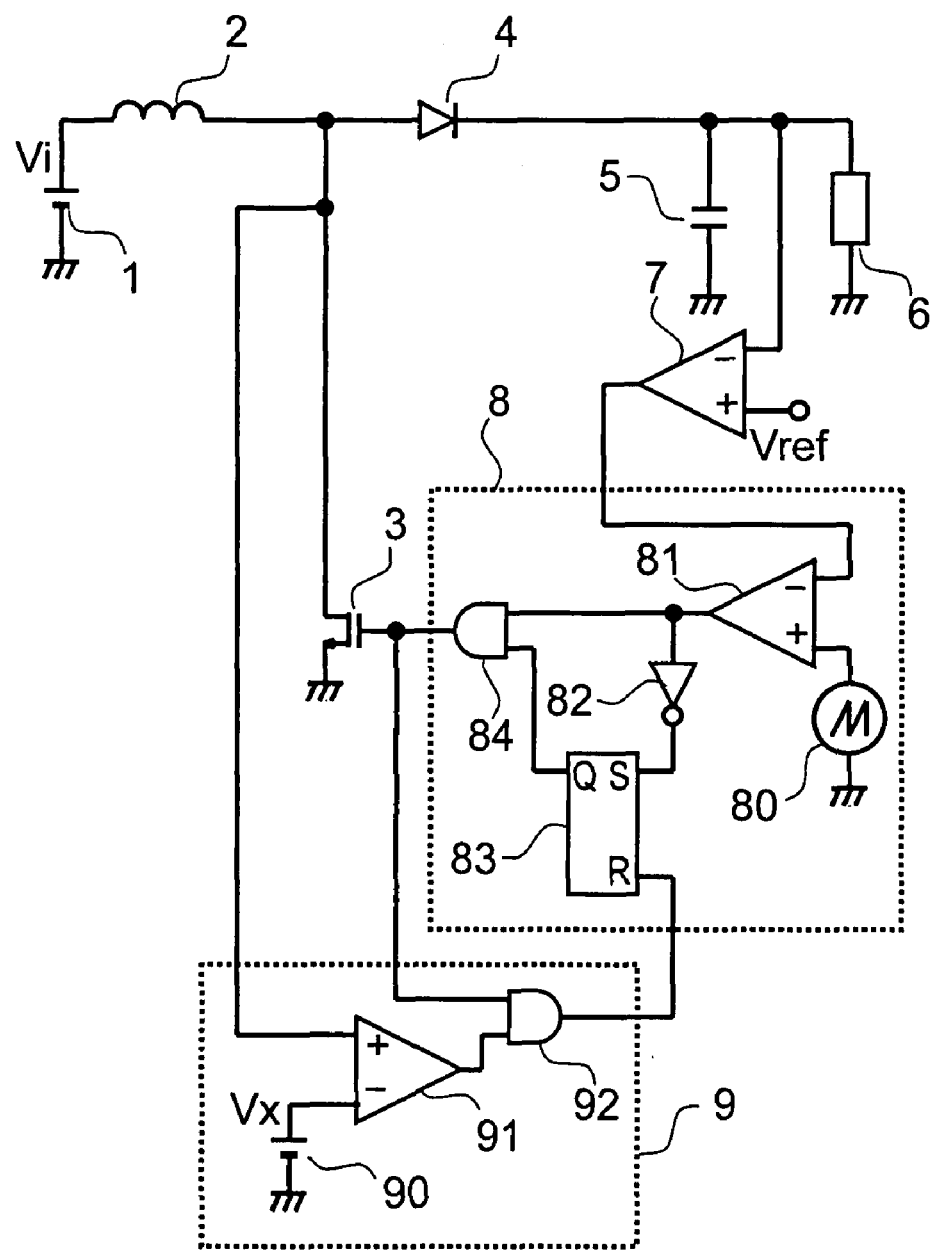
FIG. 1 is a circuit diagram showing the configuration of a step-up circuit according to a first embodiment of the present invention.

FIG. 1 is a circuit diagram showing the configuration of a step-up circuit according to a first embodiment of a DC-DC converter of the present invention. Referring to FIG. 1, numeral 1 designates a DC power supply, such as a battery, for outputting a DC voltage, and numeral 2 designates an inductor serving as a storing device. In the first embodiment, the DC voltage Vi of the DC power supply 1 is supplied to the inductor 2. One terminal of the inductor 2 is connected to the DC power supply 1, and the other terminal thereof is connected to one terminal of a main switch 3 formed of a transistor or the like. The other terminal of the main switch 3 is grounded. To the connection point of the main switch 3 and the inductor 2, the anode of a diode 4 serving as a rectifier is connected. One terminal of an output capacitor 5 serving as a capacitive device is grounded, and the other terminal thereof is connected to the cathode of the diode 4. The voltage across the two terminals of the output capacitor 5 is an output voltage Vo, and the output voltage Vo is supplied to a load 6.

The output voltage Vo supplied to the load 6 is fed back to a control circuit 8 via an error amplifier 7. The control circuit 8 outputs a drive signal Vg for ON/OFF controlling the main switch 3 so that the output voltage Vo is stabilized at a target value (target voltage: Vref). When the drive signal Vg becomes H level, the main switch 3 becomes ON.

In the control circuit 8, a sawtooth generating circuit 80 outputs a sawtooth signal Vt that increases/decreases at a predetermined frequency. A comparator 81 compares the output Ve of the error amplifier 7 with the sawtooth signal Vt and outputs a pulse signal Vp to an inverter 82 and an AND circuit 84. An RS latch 83 is set using the inverted signal of the pulse signal Vp output from the inverter 82. The AND circuit 84 outputs the logical AND of the pulse signal Vp and the output of the RS latch 83 as the drive signal Vg. The RS latch 83 is reset using the output of a protection circuit 9 that is described below.

The protection circuit 9 comprises a voltage supply circuit 90 for outputting a predetermined voltage Vx, a comparator 91 for comparing the voltage Vx with the potential at the connection point of the main switch 3 and the inductor 2, and an AND circuit 92 to which the output of the comparator 91 and the drive signal Vg are input. To the non-inverting input terminal of the comparator 91, the potential at the connection point of the main switch 3 and the inductor 2 is applied, and to the inverting input terminal thereof, the voltage Vx is applied. The output of the AND circuit 92 is input to the reset terminal of the RS latch 83 of the control circuit 8.

In the step-up circuit according to the first embodiment of the present invention configured as described above, the ordinary operation thereof will first be described below.

Referring to FIG. 1, when the main switch 3 is ON, an exciting current is passed from the DC power supply 1 via the inductor 2 and the main switch 3, and energy is stored in the inductor 2. When the main switch 3 becomes OFF, a current for charging the output capacitor 5 is passed from the DC power supply 1 via the inductor 2 and the diode 4, and the energy stored in the inductor 2 is discharged. In this way, the ON/OFF operation of the main switch 3 is repeated, that is, the switching operation thereof is carried out, whereby the DC output voltage Vo is supplied from the output capacitor 5 to the load 6. As the ON time of the main switch 3 is longer, the energy to be stored in the inductor 2 increases, and the output voltage Vo becomes higher. The output voltage Vo is represented by the following expression (1) using the ratio (hereafter referred to as duty ratio) of the ON time of the main switch 3 in one switching cycle.

$$Vo=Vi/(1-D) \tag{1}$$

Next, an operation for adjusting this duty ratio D using the control circuit 8 to stabilize the output voltage Vo at the target value (target voltage: Vref) will be described below.

The error amplifier 7 compares the output voltage Vo with the target voltage Vref, amplifies the difference and outputs an error signal Ve. When the output voltage Vo tends to become higher than the target voltage Vref, the error amplifier 7 lowers the error signal Ve; when the output voltage Vo tends to become lower than the target voltage Vref, the error amplifier 7 raises the error signal Ve.

In the control circuit 8, the comparator 81 compares the error signal Ve with the sawtooth signal Vt and outputs the pulse signal Vp. When the error signal Ve rises, the pulse width of the pulse signal Vp becomes wider; when the error signal Ve lowers, the pulse width of the pulse signal Vp becomes narrower. Since the output of the protection circuit 9 is L level during the ordinary operation as described later, the RS latch 83 is not reset and outputs an H-level signal. Hence, the AND circuit 84 outputs the pulse signal Vp as the drive signal Vg. When the output voltage Vo tends to become higher than the target voltage Vref, the error signal Ve lowers, and the pulse width of the pulse signal Vp, that is, the drive signal Vg, becomes narrower. Eventually, the duty ratio D becomes smaller, and the output voltage Vo lowers. Conversely, when the output voltage Vo tends to become lower than the target voltage Vref, the error signal Ve rises, and the pulse width of the pulse signal Vp, that is, the drive signal Vg, becomes wider. Eventually, the duty ratio D becomes larger, and the output voltage Vo rises. As the result of this operation, the output voltage Vo converges toward the target voltage Vref and becomes equal thereto.

Next, an operation that is carried out when the two terminals of the diode 4 are short-circuited will be described below, focusing on the control circuit 8 and the protection circuit 9.

When the main switch 3 is OFF, an operation similar to the ordinary operation is carried out. That is to say, the output voltage Vo is supplied to the load 6 while the output capacitor 5 is charged with a current flowing via the inductor 2 and the diode 4. The drive signal Vg from the control circuit 8 soon becomes H level, and the main switch 3 tends to turn ON. However, if the two terminals of the diode 4 are short-circuited, the electric charge charged in the output capacitor 5 is discharged via the main switch 3 by the short circuit. At this time, a voltage drop owing to the conduction resistance of the main switch 3 and the discharge current occurs across the two terminals of the main switch 3. Hence, the potential at the connection point of the main switch 3 and the inductor 2 does not lower to the voltage Vx, and the output of the comparator 91 becomes H level. Since both the output of the comparator 91 and the drive signal Vg are H level, the output of the AND circuit 92 becomes H level. Hence, in the control circuit 8, the RS latch 83 is reset and outputs an L-level signal to the AND circuit 84. The AND circuit 84, to which the L-level signal is input, outputs the drive signal Vg having L level to the main switch 3, thereby turning OFF the main switch 3.

Then, at the timing of the end of the ON time during the ordinary operation, the output of the comparator 81 becomes L level, whereby the RS latch 83 is set and outputs an H-level signal. Since the output of the comparator 81 is L level, the output of the AND circuit 84, that is, the drive signal Vg, remains L level. When the next switching cycle starts soon and the output of the comparator 81 becomes H level, the drive signal Vg becomes H level, thereby turning ON the main switch 3.

However, if the causes for the short-circuited state of the diode 4 are not eliminated at the time, the potential at the connection point of the main switch 3 and the inductor 2 does not lower to the voltage Vx, and the output of the AND circuit 92 is H level, whereby the control circuit 8 sets the drive signal Vg to L level. As a result, the main switch 3 remains OFF, and no overcurrent flows. By the repetition of the above-mentioned operation, the main switch 3 is securely protected against overcurrent. Then, after the causes for the short-circuited state of the diode 4 are eliminated, the potential at the connection point of the main switch 3 and the inductor 2 lowers to the voltage Vx, and the protection circuit 9 performs the ordinary operation and outputs an L-level signal to the control circuit 8.

Although the step-up circuit that uses the inductor as a storing device is taken as an example in the first embodiment described above, a step-up circuit (general name: charge pump circuit) that uses a (flying) capacitor as a storing device is also applicable. Furthermore, in the step-up circuit according to the first embodiment, although an example that uses the diode as a rectifier is described, the configuration of the protection circuit 9 that uses a synchronous rectifier as a rectifier is also applicable.

As described above, with the DC-DC converter according to the first embodiment of the present invention, the short-circuited state of the rectifier including a synchronous rectifier is detected securely without detecting current, whereby the main switch serving as a component can be securely protected against over-current.

Second Embodiment

Figure 2:
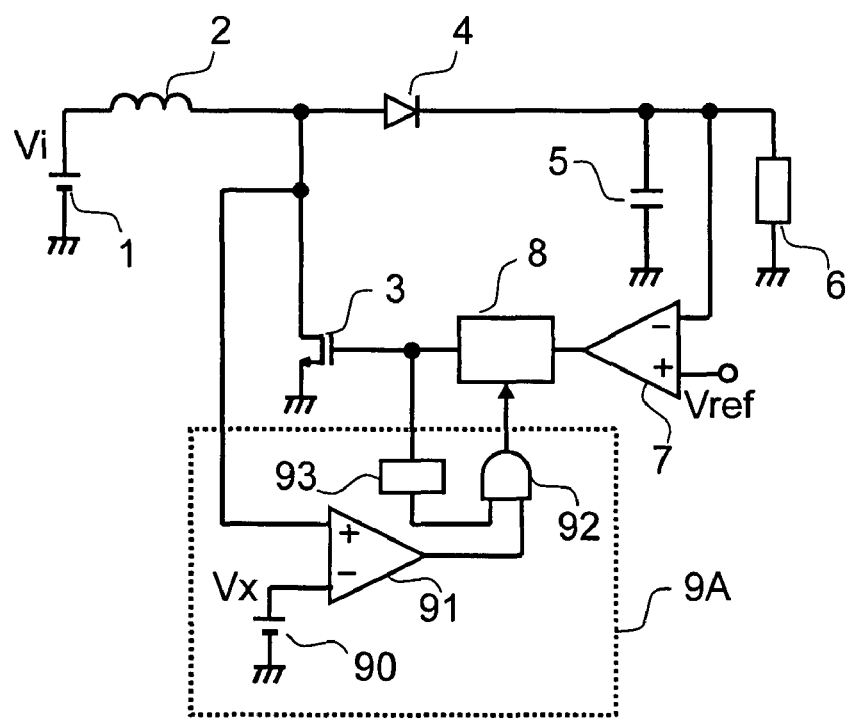
FIG. 2 is a circuit diagram showing the configuration of a step-up circuit according to a second embodiment of the present invention.

FIG. 2 is a circuit diagram showing the configuration of a step-up circuit according to a second embodiment of the DC-DC converter of the present invention. In the second embodiment shown in FIG. 2, the components having the same functions and configurations as those of the components of the step-up circuit according to the first embodiment shown in FIG. 1 are designated by the same numerals, and the descriptions in the first embodiment are applied to descriptions of the components. The configuration of the step-up circuit according to the second embodiment differs from the configuration of the step-up circuit according to the first embodiment shown in FIG. 1 in the configuration of a protection circuit 9A. The protection circuit 9A according to the second embodiment is configured such that the drive signal Vg is input to the AND circuit 92 via a delay circuit 93.

As shown in FIG. 2, the protection circuit 9A according to the second embodiment comprises the voltage supply circuit 90 for outputting the predetermined voltage Vx, the comparator 91 for comparing the voltage Vx with the potential at the connection point of the main switch 3 and the inductor 2, the delay circuit 93, to which the drive signal Vg is input, for delaying the drive signal by a predetermined time, and the AND circuit 92 to which the outputs of the comparator 91 and the delay circuit 93 are input. To the non-inverting input terminal of the comparator 91, the potential at the connection point of the main switch 3 and the inductor 2 is applied, and to the inverting input terminal thereof, the voltage Vx is applied. The output of the AND circuit 92 is input to the reset terminal of the RS latch (designated by numeral 83 in FIG. 1) of the control circuit 8.

In the configuration of the step-up circuit according to the first embodiment described above, during the ordinary operation, when the drive signal Vg becomes H level and the main switch 3 turns ON, since the turning ON speed thereof is finite, a certain time passes until the potential at the connection point of the main switch 3 and the inductor 2 lowers sufficiently, even if the time is very short. In addition, when the main switch 3 turns ON, the electric charge due to the parasitic capacitance being equivalently present across the two terminals of the main switch 3 is discharged by the short circuit, and a voltage drop occurs. Hence, during a very short period after the turning ON, the potential at the connection point of the main switch 3 and the inductor 2 becomes higher than the voltage Vx. If the response speeds of the comparator 91 and the AND circuit 92 are high, the protection circuit 9 may operate even during the ordinary operation.

The protection operation performed in the step-up circuit according to the second embodiment when the two terminals of the diode 4 are short-circuited is the same as the protection operation performed in the step-up circuit according to the first embodiment. However, since the drive signal Vg output from the control circuit 8 is input to the AND circuit 92 via the delay circuit 93, the timing of inputting the drive signal Vg to the AND circuit 92 of the protection circuit 9A is delayed by the delay time being set in the delay circuit 93 from the turning ON time of the main switch 3. Hence, the step-up circuit according to the second embodiment is configured such that the above-mentioned false operation of the protection circuit during the ordinary operation can be avoided. The delay time of the delay circuit 93 should only be set so as to be slightly longer than the turning ON time during the ordinary operation.

As described above, with the DC-DC converter according to the second embodiment of the present invention, the short-circuited state of the rectifier including a synchronous rectifier is detected securely without detecting current, whereby the main switch serving as a component can be protected against overcurrent. Furthermore, the false operation in the protection circuit during the ordinary operation is prevented, and it is possible to construct a highly reliable DC-DC converter.

Third Embodiment

Figure 3:
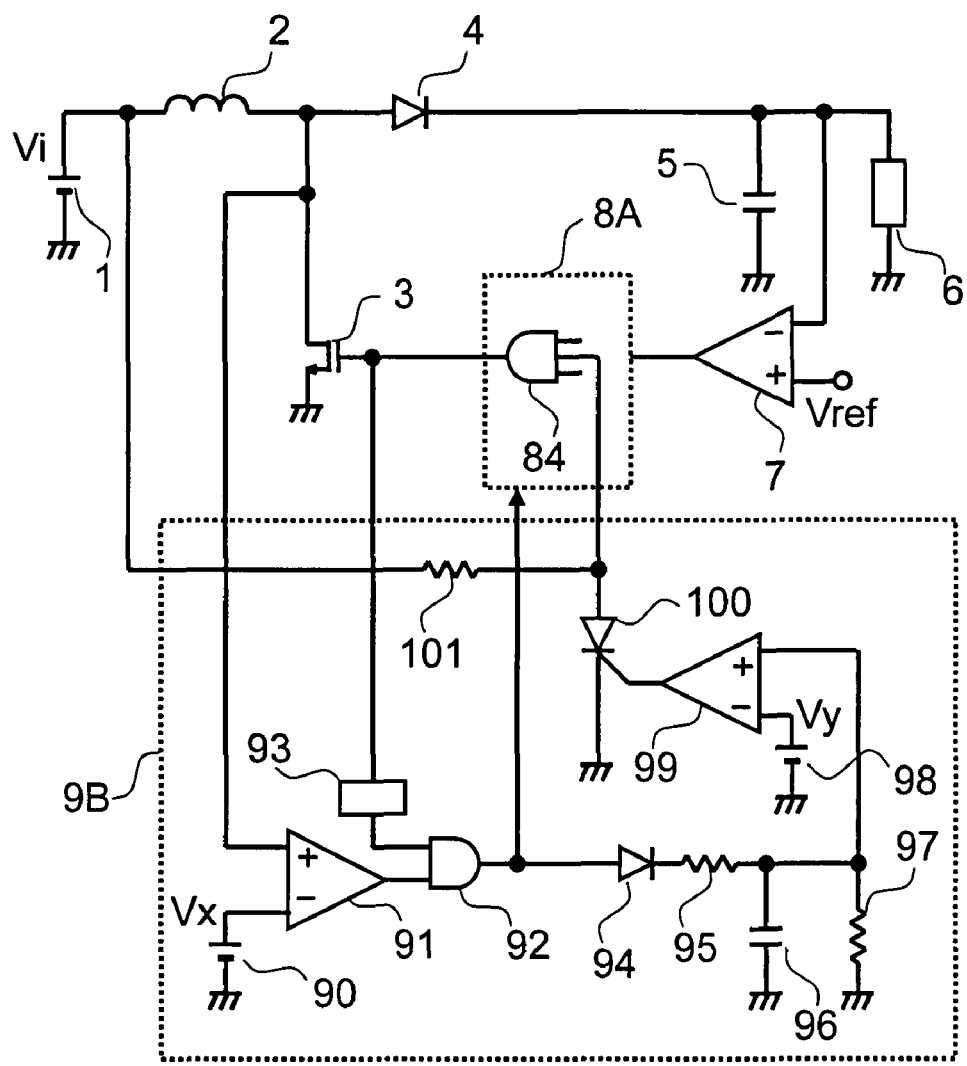
FIG. 3 is a circuit diagram showing the configuration of a step-up circuit according to a third embodiment of the present invention.

FIG. 3 is a circuit diagram showing the configuration of a step-up circuit according to a third embodiment of the present invention. In the third embodiment shown in FIG. 3, the components having the same functions and configurations as those of the components of the step-up circuits according to the first embodiment and the second embodiment shown in FIGS. 1 and 2 are designated by the same numerals, and the descriptions in the first embodiment and the second embodiment are applied to descriptions of the components. The configuration of the step-up circuit according to the third embodiment differs from the configuration of the step-up circuit according to the first embodiment shown in FIG. 1 in the configurations of a control circuit 8A and a protection circuit 9B. Although the AND circuit 84 shown in FIG. 1 has two input terminals, the AND circuit 84 of the control circuit 8A according to the third embodiment has three input terminals, and the signal from the protection circuit 9B is directly input. The delay circuit 93 described in the second embodiment is provided for the protection circuit 9B according to the third embodiment to prevent the false operation of the protection circuit 9B during the ordinary operation.

As shown in FIG. 3, the protection circuit 9B according to the third embodiment comprises the voltage supply circuit 90 for outputting the predetermined voltage Vx, the comparator 91 for comparing the voltage Vx with the potential at the connection point of the main switch 3 and the inductor 2, the delay circuit 93 for delaying the drive signal Vg by a predetermined time, and the AND circuit 92 to which the outputs of the comparator 91 and the delay circuit 93 are input. To the non-inverting input terminal of the comparator 91, the potential at the connection point of the main switch 3 and the inductor 2 is applied, and to the inverting input terminal thereof, the voltage Vx is applied. The output of the AND circuit 92 is input to the reset terminal of the RS latch (designated by numeral 83 in FIG. 1) of the control circuit 8A and is also input to a capacitor 96 via a diode 94 and a resistor 95 to charge the capacitor. The capacitor 96 is connected in parallel with a resistor 97 to form a parallel circuit. The potential of the capacitor 96 is compared with the predetermined voltage Vy of a voltage supply circuit 98 using a comparator 99, and a trigger device 100 is ON/OFF controlled using the output of the comparator 99, that is, the result of the comparison. The trigger device 100 is connected to the DC power supply 1 via a resistor 101 so that a holding current flows from the DC power supply 1 having the input voltage Vi to the trigger device 100. The connection point of the trigger device 100 and the resistor 101 is connected to the input terminal of the AND circuit 84.

In the step-up circuits according to the first embodiment and the second embodiment described above, it is assumed that the diode 4 is short-circuited by an external cause, and the step-up circuits are configured such that if this cause for the short circuit is eliminated, the ordinary operation is restored automatically.

The protection operation performed in the step-up circuit according to the third embodiment when the two terminals of the diode 4 are short-circuited is the same as the protection operation performed in the step-up circuits according to the first embodiment and the second embodiment. However, if the short-circuited state of the diode 4 is detected by the switching operation of the main switch 3 performed in a very short ON time and if the period during which the main switch 3 is protected against overcurrent continues for a predetermined period, the switching operation is stopped.

In the step-up circuit according to the third embodiment, the resistance values of the resistor 95 and the resistor 97 are adjusted preliminarily so that the capacitor 96 is charged gradually during the switching operation of the main switch 3 performed in the very short ON time. When the potential of the capacitor 96 reaches the predetermined voltage Vy by the switching operation of the main switch 3 performed in the very short ON time, the comparator 99 outputs an H-level signal to the control terminal of the trigger device 100, and the trigger device 100 turns ON. When the trigger device 100 turns ON, the output of the AND circuit 84 of the control circuit 8A, that is, the drive signal Vg, is fixed at L level. Once the trigger device 100 turns ON, the ON state is maintained while the holding current is present. Hence, the step-up circuit cannot resume the switching operation until the input voltage Vi of the step-up circuit lowers so that the holding current cannot be supplied to the trigger device 100.

As described above, the step-up circuit according to the third embodiment is configured to carry out shut-down protection operation such that the step-up circuit is shut off when the short-circuited state of the diode 4 continues for a certain long period.

As described above, with the DC-DC converter according to the third embodiment of the present invention, the short-circuited state of the rectifier including a synchronous rectifier is detected securely without detecting current, whereby the main switch serving as a component can be protected against overcurrent. Furthermore, the false operation in the protection circuit during the ordinary operation is prevented, and the step-up circuit is shut down securely when the short-circuited state of the rectifier continues for a predetermined period.

Although an example in which the diode is used as a rectifying means in the step-up circuits according to the first to third embodiments of the present invention is described, the present invention is applicable to all the other rectifying means. For example, the present invention is applicable to a DC-DC converter incorporating a synchronous rectifier, and similar effects are obtained.

In the DC-DC converter according to the first embodiment described above, the configuration in which the step-up circuit is provided with the protection circuit is described. However, the present invention is not limited to this kind of configuration. For example, a step-up/down circuit can be provided with the protection circuits described in the embodiments, and similar effects are obtained.

Figure 4:
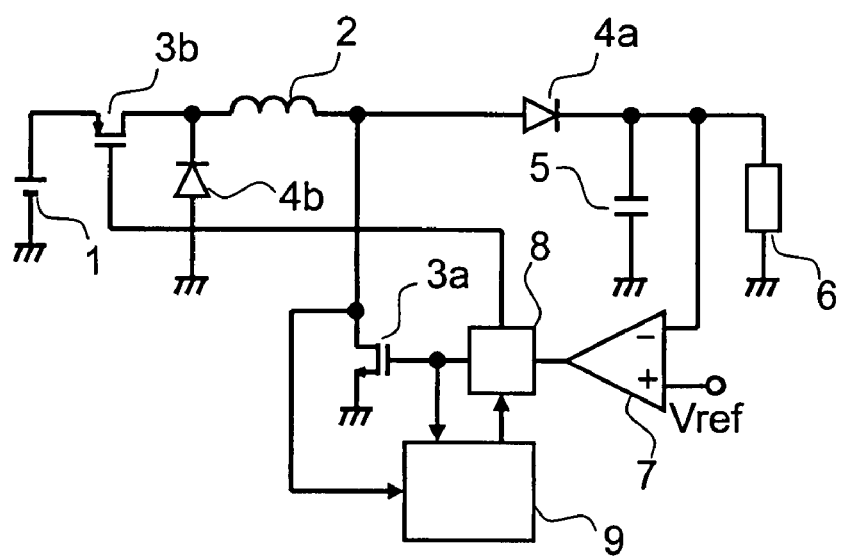
FIG. 4 is a circuit diagram showing another configuration of the DC-DC converter according to the present invention.
Figure 5:
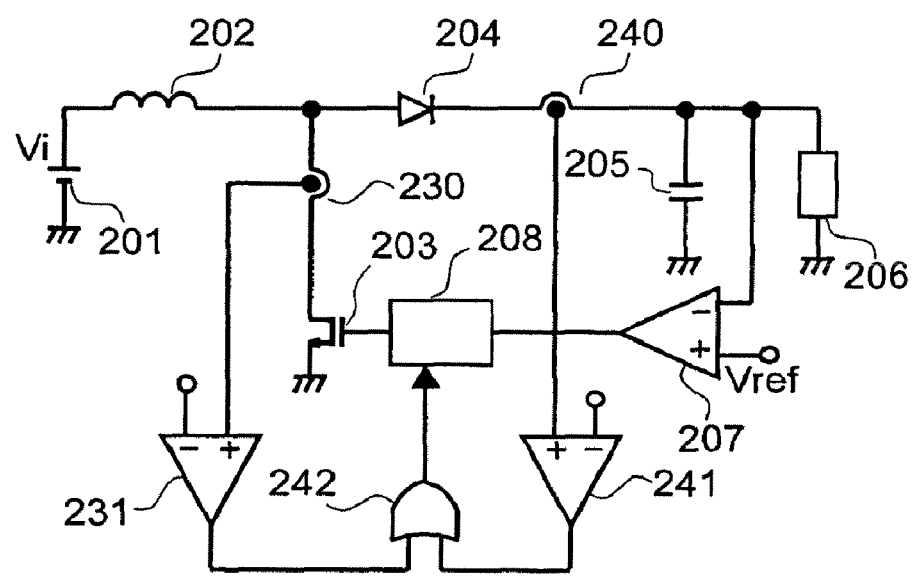
FIG. 5 is a circuit diagram showing the configuration of the conventional step-up circuit.

FIG. 4 is a circuit diagram showing the configuration of a bridge-type step-up/down converter serving as an example of the DC-DC converter according to the present invention. Referring to FIG. 4, the components having the same functions and configurations as those of the components of the step-up circuit according to the first embodiment are designated by the same numerals, and their descriptions are omitted.

As shown in FIG. 4, a main switch 3a serving as a first switching device and a diode 4a serving as a first rectifying means, for functioning as a step-up circuit, are provided for this step-up/down circuit. In addition, a protection circuit 9 for protecting the first main switch 3a against overcurrent at the time when the two terminals of the diode 4a is short-circuited is also provided. Furthermore, a main switch 3b serving as a second switching device and a diode 4b serving as a second rectifying means, for functioning as a step-down circuit, are provided for the step-up/down circuit. Still further, as a protection circuit for the step-up/down circuit shown in FIG. 4, the protection circuit 9A according to the second embodiment shown in FIG. 2 or the protection circuit 9B according to the third embodiment shown in FIG. 3 is used, whereby the function of the protection circuit can be enhanced further.

The present invention is useful as a highly reliable DC-DC converter for supplying a DC voltage to various electronic apparatuses.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A DC-DC converter comprising:
   a rectifier and a switching device connected in series,
   a storing device, having a first terminal connected to a connection point of said rectifier and said switching device, and a second terminal connected to a DC power supply, for storing energy during the ON period of said switching device and for discharging the energy via said rectifier during the OFF period of said switching device,
   a capacitive device, having a first terminal grounded and a second terminal connected to said rectifier, for smoothing the output of said rectifier and for outputting a voltage between the first and second terminals of said capacitive device to a load as an output voltage,
   a control circuit for generating a drive signal for ON/OFF controlling said switching device by comparing said output voltage with a target voltage, and
   in a state in which the potential at the connection point of said rectifier and said switching device is detected and said drive signal turns ON said switching device, a protection circuit for turning OFF said switching device at the time when the potential at said connection point is a predetermined potential or more, said predetermined potential being lower than said target voltage.

2. The DC-DC converter according to claim 1, wherein said protection circuit comprises a voltage supply circuit for generating said predetermined potential, a comparator for comparing the potential at said connection point with said predetermined potential, and a logic circuit for outputting a predetermined signal to said control circuit when said drive signal turns ON said switching device and when the output of said comparator indicates that the potential at said connection point is the predetermined potential or more, wherein
   said control circuit is configured such that said drive signal turns OFF said switching device for a predetermined period when said predetermined signal is input from said logic circuit.

3. The DC-DC converter according to claim 2, wherein said rectifier, said switching device, said storing device, said capacitive device, said control circuit, and said protection circuit constitute a step-up circuit.

4. The DC-DC converter according to claim 2, wherein said rectifier, said switching device, said storing device, said capacitive device, said control circuit, and said protection circuit constitute a step-up/down circuit.

5. The DC-DC converter according to claim 1, wherein said rectifier, said switching device, said storing device, said capacitive device, said control circuit, and said protection circuit constitute a step-up circuit.

6. The DC-DC converter according to claim 1, wherein said rectifier, said switching device, said storing device, said capacitive device, said control circuit, and said protection circuit constitute a step-up/down circuit.

7. A DC-DC converter comprising:
   a rectifier and a switching device connected in series,
   a storing device for storing energy during the ON period of said switching device and for discharging the energy via said rectifier during the OFF period of said switching device,
   a capacitive device for smoothing the output of said rectifier,
   a control circuit for generating a drive signal for ON/OFF controlling said switching device, and
   in a state in which the potential at the connection point of said rectifier and said switching device is detected and said drive signal turns ON said switching device, a protection circuit for turning OFF said switching device at the time when the potential at said connection point is a predetermined potential or more, wherein:
   said protection circuit comprises a voltage supply circuit for generating said predetermined potential, a comparator for comparing the potential at said connection point with said predetermined potential, a logic circuit for outputting a predetermined signal to said control circuit when said drive signal turns ON said switching device and when the output of said comparator indicates that the potential at said connection point is the predetermined potential or more, and a delay circuit for delaying said drive signal input to said logic circuit by a predetermined delay time, and
   said control circuit is configured such that said drive signal turns OFF said switching device for a predetermined period when said predetermined signal is input from said logic circuit.

8. The DC-DC converter according to claim 7, wherein said protection circuit is configured such that said switching device is fixed to the OFF state using said drive signal when the period during which said logic circuit outputs said predetermined signal at each switching operation of said switching device continues.

9. The DC-DC converter according to claim 7, wherein said rectifier, said switching device, said storing device, said capacitive device, said control circuit, and said protection circuit constitute a step-up circuit.

10. The DC-DC converter according to claim 7, wherein said rectifier, said switching device, said storing device, said capacitive device, said control circuit, and said protection circuit constitute a step-up/down circuit.

11. A DC-DC converter comprising:
a rectifier and a switching device connected in series,
a storing device for storing energy during the ON period of said switching device and for discharging the energy via said rectifier during the OFF period of said switching device,
a capacitive device for smoothing the output of said rectifier,
a control circuit for generating a drive signal for ON/OFF controlling said switching device, and
in a state in which the potential at the connection point of said rectifier and said switching device is detected and said drive signal turns ON said switching device, a protection circuit for turning OFF said switching device at the time when the potential at said connection point is a predetermined potential or more, wherein
said protection circuit comprises a voltage supply circuit for generating said predetermined potential, a comparator for comparing the potential at said connection point with said predetermined potential, and a logic circuit for outputting a predetermined signal to said control circuit when said drive signal turns ON said switching device and when the output of said comparator indicates that the potential at said connection point is the predetermined potential or more, wherein:
said protection circuit is configured such that said switching device is fixed to the OFF state using said drive signal when the period during which said logic circuit outputs said predetermined signal at each switching operation of said switching device continues, and
said control circuit is configured such that said drive signal turns OFF said switching device for a predetermined period when said predetermined signal is input from said logic circuit.

12. The DC-DC converter according to claim 11, wherein said rectifier, said switching device, said storing device, said capacitive device, said control circuit, and said protection circuit constitute a step-up circuit.

13. The DC-DC converter according to claim 11, said rectifier, said switching device, said storing device, said capacitive device, said control circuit, and said protection circuit constitute a step-up/down circuit.

\* \* \* \* \*